United States Patent
Cornell (10) Patent No.: US 10,524,010 B2
(45) Date of Patent: Dec. 31, 2019

(54) SOCIAL INTERACTION USER INTERFACE FOR VIDEOS

(71) Applicant: Facebook, Inc., Menlo Park, CA (US)

(72) Inventor: Alex Douglas Cornell, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/806,208

(22) Filed: Nov. 7, 2017

(65) Prior Publication Data

US 2019/0141402 A1    May 9, 2019

(51) Int. Cl.
| | |
|---|---|
| H04N 21/472 | (2011.01) |
| H04N 21/431 | (2011.01) |
| G06Q 50/00 | (2012.01) |
| H04N 21/45 | (2011.01) |
| G06F 3/0484 | (2013.01) |
| H04N 21/4788 | (2011.01) |
| H04N 21/4722 | (2011.01) |

(52) U.S. Cl.
CPC ... *H04N 21/47217* (2013.01); *G06F 3/04847* (2013.01); *G06Q 50/01* (2013.01); *H04N 21/431* (2013.01); *H04N 21/4532* (2013.01); *H04N 21/4722* (2013.01); *H04N 21/4788* (2013.01)

(58) Field of Classification Search
CPC .... G06F 3/0487; G06Q 50/01; H04N 21/431; H04N 21/4532
See application file for complete search history.

(56) References Cited

U.S. PATENT DOCUMENTS

| | | | |
|---|---|---|---|
| D658,675 S | 5/2012 | Gleasman et al. | |
| D664,974 S | 8/2012 | Gleasman et al. | |
| D704,731 S | 5/2014 | Pearson et al. | |
| 8,898,633 B2 * | 11/2014 | Bryant | G05B 19/056 717/106 |
| D719,187 S | 12/2014 | Arnold et al. | |
| D735,742 S | 8/2015 | Lee et al. | |
| D741,885 S | 10/2015 | Gomez | |
| D746,305 S | 12/2015 | Gray | |
| D754,688 S | 4/2016 | Chaudhri et al. | |
| D754,712 S | 4/2016 | Reynolds-Flatt et al. | |
| D756,398 S | 5/2016 | Ng | |

(Continued)

OTHER PUBLICATIONS

Gasimli, O., "Choreographic animations with Android's BottomSheet." Android Pub, posted Nov. 2, 2017 (Retrieved from the Internet Mar. 13, 2019). Internet URL: <https://android.jlelse.eu/choreographic-animations-with-androids-bottomsheet-fef06e6ecb81> (Year: 2017).

(Continued)

*Primary Examiner* — Reza Nabi
(74) *Attorney, Agent, or Firm* — Fenwick & West LLP (57) ABSTRACT

In response to a first user input in connection with a displayed video, a social interaction toolbar is displayed along an edge of a viewing area. The social interaction toolbar includes a plurality of buttons, each corresponding to a social interaction feature. Simultaneously, the video is displayed across substantially all of the viewing area. In response to receiving a selection of a button in the social interaction toolbar, a user interface of the social interaction feature corresponding to the selected button is displayed.

15 Claims, 7 Drawing Sheets

(56) References Cited

U.S. PATENT DOCUMENTS

| | | | |
|---|---|---|---|
| D759,705 S | 6/2016 | Arroyo et al. | |
| D763,903 S | 8/2016 | Pendlay et al. | |
| D765,102 S * | 8/2016 | Lee | D14/485 |
| D767,613 S | 9/2016 | Bauer | |
| D768,177 S | 10/2016 | Han et al. | |
| D768,696 S | 10/2016 | Gagnier | |
| D770,475 S * | 11/2016 | Choi | D14/485 |
| D776,138 S * | 1/2017 | Cornell | D14/485 |
| D776,704 S | 1/2017 | Yu et al. | |
| D777,765 S | 1/2017 | Ball et al. | |
| D781,881 S * | 3/2017 | Cornell | D14/485 |
| D781,900 S | 3/2017 | Apodaca et al. | |
| D783,043 S | 4/2017 | Hosaka | |
| D784,393 S | 4/2017 | Federighi et al. | |
| D785,641 S | 5/2017 | Jon et al. | |
| D789,384 S * | 6/2017 | Lin | D14/485 |
| D792,903 S | 7/2017 | Park et al. | |
| D797,140 S | 9/2017 | Hirai et al. | |
| D797,764 S | 9/2017 | Bouroullec et al. | |
| D803,240 S * | 11/2017 | Cornell | D14/485 |
| D805,101 S | 12/2017 | Zhao et al. | |
| D813,903 S | 3/2018 | Boyd et al. | |
| D814,510 S * | 4/2018 | Cornell | D14/489 |
| D817,994 S * | 5/2018 | Jou | D14/487 |
| D819,659 S | 6/2018 | Wada et al. | |
| D821,434 S | 6/2018 | Park et al. | |
| D823,867 S | 7/2018 | Berlow | |
| D826,954 S | 8/2018 | Wang | |
| D826,968 S | 8/2018 | Varshavskaya et al. | |
| D828,852 S | 9/2018 | Park et al. | |
| D829,733 S | 10/2018 | Clapper et al. | |
| D835,125 S | 12/2018 | Tople et al. | |
| D836,663 S | 12/2018 | Chung et al. | |
| 10,218,939 B2 * | 2/2019 | Taylor | G06F 3/0488 |
| D842,871 S | 3/2019 | Clediere et al. | |
| D843,399 S | 3/2019 | Park et al. | |
| 10,225,545 B2 * | 3/2019 | Gemayel | G03B 17/53 |
| D844,659 S | 4/2019 | Ball et al. | |
| D847,171 S * | 4/2019 | Nishiura | D14/486 |
| D847,196 S | 4/2019 | Tsukamoto et al. | |
| 10,261,683 B2 * | 4/2019 | Han | G06F 3/04886 |
| D847,853 S | 5/2019 | Wen et al. | |
| D849,769 S | 5/2019 | Matas | |
| D849,770 S | 5/2019 | Matas | |
| 10,296,194 B2 * | 5/2019 | McLean | G06F 16/71 |
| D851,674 S | 6/2019 | Bass et al. | |
| D852,215 S | 6/2019 | Westerhold et al. | |
| 10,346,030 B2 * | 7/2019 | Wells | G06F 3/0416 |
| D858,546 S | 9/2019 | Haile et al. | |
| D858,552 S * | 9/2019 | Westerhold | D14/486 |
| D859,442 S | 9/2019 | Zhang et al. | |
| D860,233 S | 9/2019 | Chaudhri et al. | |
| 2006/0108349 A1 | 5/2006 | Finley | H02K 15/165 219/469 |
| 2007/0128899 A1 * | 6/2007 | Mayer | G06F 9/4406 439/152 |
| 2007/0208981 A1 * | 9/2007 | Restrepo | H02H 1/0015 714/731 |
| 2007/0282621 A1 * | 12/2007 | Altman | G06Q 10/10 705/319 |
| 2008/0120129 A1 * | 5/2008 | Seubert | G06Q 10/06 705/35 |
| 2008/0139306 A1 * | 6/2008 | Lutnick | G06Q 30/02 463/30 |
| 2008/0167106 A1 * | 7/2008 | Lutnick | G07F 17/32 463/16 |
| 2008/0177994 A1 * | 7/2008 | Mayer | G06F 9/4418 713/2 |
| 2008/0268931 A1 * | 10/2008 | Alderucci | G07F 17/3209 463/11 |
| 2008/0300055 A1 * | 12/2008 | Lutnick | G07F 17/3209 463/39 |
| 2009/0100096 A1 * | 4/2009 | Erlichson | H04L 67/02 |
| 2009/0164484 A1 * | 6/2009 | Horowitz | H04N 7/17318 |
| 2010/0211431 A1 * | 8/2010 | Lutnick | G06Q 30/02 705/14.12 |
| 2011/0113363 A1 * | 5/2011 | Hunt | G06F 3/0481 715/800 |
| 2013/0051754 A1 * | 2/2013 | Gilpin | H04N 21/4756 386/241 |
| 2013/0332850 A1 * | 12/2013 | Bovet | H04L 51/22 715/752 |
| 2014/0019863 A1 * | 1/2014 | Callanan | G06F 3/0484 715/720 |
| 2014/0149918 A1 * | 5/2014 | Asokan | G06Q 30/0255 715/783 |
| 2014/0214920 A1 * | 7/2014 | Wong | H04N 21/47202 709/203 |
| 2015/0015500 A1 * | 1/2015 | Lee | G06F 3/016 345/173 |
| 2015/0117839 A1 * | 4/2015 | Oberbrunner | G11B 27/34 386/280 |
| 2015/0150066 A1 * | 5/2015 | Park | H04N 21/478 725/110 |
| 2015/0248389 A1 * | 9/2015 | Kahn | G06F 17/241 715/230 |
| 2016/0049106 A1 | 2/2016 | Connell et al. | |
| 2016/0062639 A1 * | 3/2016 | Hwang | G06F 3/04883 715/783 |
| 2016/0105505 A1 * | 4/2016 | Gilson | H04L 67/1095 709/219 |
| 2016/0343345 A1 * | 11/2016 | Moon | G08C 17/02 |
| 2017/0024178 A1 * | 1/2017 | Jeong | G06T 3/40 |
| 2017/0171267 A1 * | 6/2017 | Cornell | H04L 65/4076 |
| 2017/0329465 A1 * | 11/2017 | Hong | G06F 3/0482 |
| 2017/0344256 A1 * | 11/2017 | Gnedin | G06F 3/0219 |
| 2017/0344257 A1 * | 11/2017 | Gnedin | H04L 51/36 |
| 2017/0357382 A1 * | 12/2017 | Miura | G06F 3/04883 |
| 2018/0032224 A1 * | 2/2018 | Cornell | H04N 21/2187 |
| 2018/0034874 A1 * | 2/2018 | Cornell | H04L 65/403 |
| 2018/0039408 A1 * | 2/2018 | Cheong | G06F 1/1652 |
| 2018/0059874 A1 * | 3/2018 | Zhang | G06F 3/0481 |
| 2018/0157381 A1 * | 6/2018 | Jung | G06F 3/0481 |
| 2018/0192141 A1 * | 7/2018 | Akumiah | H04L 67/20 |
| 2019/0004821 A1 * | 1/2019 | Uppal | G06F 9/451 |
| 2019/0121910 A1 * | 4/2019 | Cornell | G06Q 50/01 |
| 2019/0141402 A1 * | 5/2019 | Cornell | H04N 21/47217 |
| 2019/0187893 A1 * | 6/2019 | Gan | G06F 3/0488 |
| 2019/0272064 A1 * | 9/2019 | Ghassabian | G06Q 30/0257 |

OTHER PUBLICATIONS

Luleci, E., "Android: Bottom Sheet." Android Bits, posted Aug. 3, 2016 (Retrieved from the Internet Mar. 13, 2019). Internet URL: <https://medium .com/android-bits/android-bottom-sheet-30284293f066> (Year: 2016).

Ogbo, O., "Developing Android apps with bottom sheets." Android Authority, posted Aug. 8, 2016 (Retrieved from the Internet Mar. 13, 2019). Internet URL: <https://www.androidauthority.com/bottom-sheets-707252/> (Year: 2016).

Suleiman, "Bottom Sheet with Android Design Support Library." Grafix Artist, published Mar. 17, 2016 (Retrieved from the Internet Mar. 13, 2019). Internet URL: <https://blog.iamsuleiman.com/bottom-sheet-android-design-support-library/> (Year: 2016).

Codepath, "Shared Element Activity Transition," Oct. 18, 2017, 4 pages, [Online] [Retrieved on Sep. 18, 2019] Retrieved from the Internet Archive <URL:https://web.archive.org/web/20171018070155/ https://guides.codepath.com/android/Shared-Element-Activity-Transition>.

Pandya, V., "Facebook Notifications," Dribbble.com, Nov. 7, 2016, 4 pages, [Online] [Retrieved on Sep. 18, 2019] Retrieved from the Internet <URL: https://dribbble.com/shots/3075045-Facebook-Notifications>.

* cited by examiner

SOCIAL INTERACTION USER INTERFACE FOR VIDEOS

BACKGROUND

This disclosure relates generally to a video player user interface, and more particularly to a graphical user interface providing access to social interaction features during display of a video.

Current graphical user interfaces (GUIs) for interacting with playing videos do not provide intuitive controls and a quality viewing experience. The growth of social video sharing has increased the number of ways in which users can interact with videos, which complicate modern user interfaces. Current GUIs usually have either a small video and a large interactive area, or a large video and a small interactive area. Large interactive areas may provide access to many or all available interactive features, but the interactive controls are often confusing to the user, and displaying a large interactive area with many controls detracts from the experience of viewing the video. Current GUIs with small interactive areas provide a better viewing experience of the video, but make it difficult for the user to access the various available interactive features, or may not provide access to the range of interactive features users expect.

SUMMARY

The above and other issues are addressed by a structured graphical user interface (GUI) for improved access to social interaction features during video playback. The structured GUI described herein provides a clean and consistent way to interact with the video across different aspect ratios. The GUI allows a video to be displayed fully across a viewing area unless the user is interacting with a particular feature, and it provides easy-to-use controls for activating and hiding interactive features.

In an embodiment, a client device displays a video across substantially all of a viewing area. In response to a first user input in connection with the displayed video, the client device displays a social interaction toolbar along an edge of a viewing area. The social interaction toolbar includes a plurality of buttons, each corresponding to a social interaction feature. Simultaneously, the client device displays the video across substantially all of the viewing area. The client device receives a selection of a button in the social interaction toolbar. In response to receiving the selection, the client displays a user interface of the social interaction feature corresponding to the selected button.

The figures depict various embodiments of the present invention for the purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
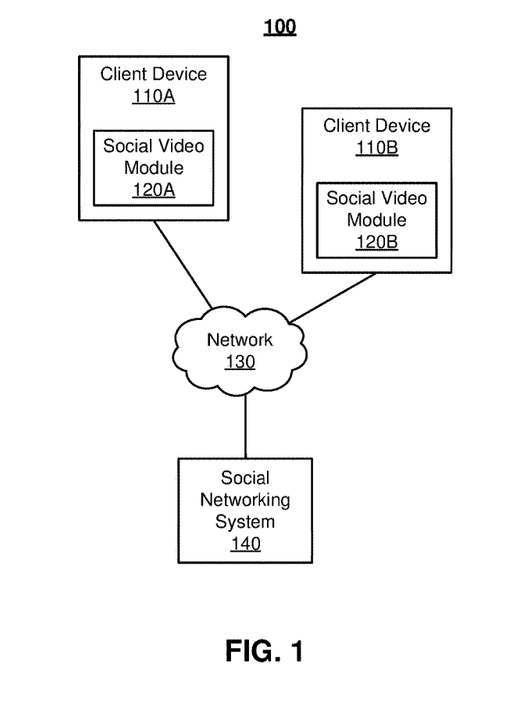
FIG. 1 is a high-level block diagram illustrating a system environment for video sharing.

FIG. 1 is a high-level block diagram illustrating a system environment 100 for video sharing. The environment 100 includes multiple client devices 110 each executing a social video module 120. The client devices 110 are connected to a social networking system 140 via a network 130. While only a few client devices 110 are shown in FIG. 1, embodiments of the environment 100 can have many such entities connected to the network 130. Other components may also be connected to the network 130.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110B" in the figures.

A client device 110 is a computing device that can transmit and/or receive data via the network 130. A user may use the client 110 device to perform functions such as viewing a video (e.g., using the social video module 120), interacting with the social networking system 140 (e.g., using the social video module 120), browsing websites on web servers on the network 130, consuming digital content received via the network 130, and executing software applications. For example, the client device 110 may be a smartphone or a tablet, notebook, or desktop computer. In addition, the client device 110 may be an Internet-of-Things (IoT)-connected device such as a home appliance. The client device 110 includes an associated display screen on which the user may view digital content, such as videos and interactive content received via the social networking system 140. For example, the display screen may be integrated into the client device 110 or electronically connected to the device via a wired or wireless connection. The client device 110 also includes one or more user associated input interfaces, such as a touch screen, mouse, buttons, or keyboard.

The client devices 110 are configured to communicate via the network 130, which may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

The client device 110 may execute one or more applications ("apps") that extend the functionality of the client device. The apps may include a web browser that allows the client device 110 to interact with websites provided by servers connected to the network 130. The apps may also include one or more dedicated apps for accessing the social networking system 140. One of these apps may be, or may include, the social video module 120. The social video module 120 illustrated within the client device 110 represents an app or module within an app for interacting with videos through the social networking system 140 via the network 130. For example, the social video module 120 enables a user of the client device 110 to engage with videos and other users of the social networking system 140 by, e.g., commenting on videos, sharing videos, sending messages to other users, viewing information about videos, etc. The social networking system 140 is described in detail with respect to FIG. 2.

In some embodiments, the social video module 120 is a dedicated app for social video sharing. In other embodiments, the social video module 120 is integrated into a social networking app. In other embodiments, the social video module 120 can be integrated into multiple different apps on the client device 110. The user can download and install apps on the client device 110 for specific purposes, such as engaging with the social networking system 140. Alternatively, the functionality of an app may be incorporated into an operating system of the client device 110 or included in other native functionality of the client device 110.

The social video module 120 presents a structured graphical user interface that provides access to social interaction features during video playback. In particular, the social video module 120 provides a social interaction user interface through which a user can interact with videos and related social content, which is provided by the social networking system 140. The social interaction user interface provides access to the interactive social content via a social interaction toolbar, which is displayed along the edge of the screen associated with the client device 110. The social interaction toolbar includes buttons that the user can select to display and remove various social interaction features on-screen when desired. The social interaction toolbar provides quick, user-friendly access to the various social features available to the user without obstructing or interfering with a displayed video.

Figure 2:
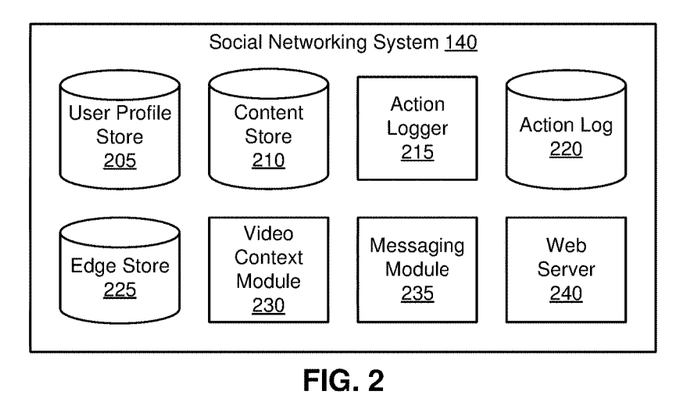
FIG. 2 is a block diagram illustrating an architecture of the social networking system according to one embodiment.

FIG. 2 is a block diagram of an architecture of the social networking system 140, according to one embodiment. The social networking system 140 includes modules for providing videos and social interaction features related to the videos to users. For example, the social networking system 140 may provide videos and content to be optionally displayed with the videos, such as contextual information about the videos, messages, and contacts for sharing videos. The social networking system 140 shown in FIG. 2 includes a user profile store 205, a content store 210, an action logger 215, an action log 220, an edge store 225, a video context module 230, a messaging module 235, and a web server 240. In other embodiments, the social networking system 140 may include additional, fewer, or different modules. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other online system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, an advertisement, a brand page, or any other type of content. Social networking system users may create objects stored by the content store 210, such as status updates, photos tagged by users to be associated with other objects in the social networking system 140, events, groups, or applications. In some embodiments, objects, such as advertisements, are received from third-party applications or third-party applications separate from the social networking system 140. In one embodiment, objects in the content store 210 represent single pieces of content, or content "items." Hence, online system users are encouraged to communicate with each other by posting text and content items of various types of media to the social networking system 140 through various communication channels. This increases the amount of interaction of users with each other and increases the frequency with which users interact within the social networking system 140.

In various embodiments, a content item includes various components capable of being identified and retrieved by the social networking system 140. Example components of a content item include: a title, text data, image data, audio data, video data, a landing page, a user associated with the content item, or any other suitable information. The social networking system 140 may retrieve one or more specific components of a content item for presentation in some embodiments. For example, the social networking system 140 may identify a title and an image from a content item and provide the title and the image for presentation rather than the content item in its entirety.

The action logger 215 receives communications about user actions internal to and external to the social networking system 140 and populates the action log 220 with information about these user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140. Users may interact with various objects on the social networking system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Interactions may further include interactions with videos, users, and other types of content via the social video module 120, e.g., viewing videos, commenting on videos, sharing videos, viewing video information, communicating with a user via the social video module, and any other interactive features made available by the social video module.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing content with other users of the social networking system, and commenting on content shared by other users of the social networking system.

The video context module 230 provides contextual information from the social networking system 140 for videos transmitted to social video modules 120 of client devices 110. For a particular video, the video context module 230 aggregates contextual information related to that video, which may include video information (e.g., title, description, provider, upload date), user comments, user reactions (e.g., like, dislike, love, etc.), a list of related videos, one or more categories, and license information. The video context module 230 may also retrieve from storage (e.g., from the content store 210) links to related content, e.g., links to the video provider and users who left comments. The video context module 230 may retrieve from the content store 210, action log 220, or other database all relevant contextual information for a video, or a subset of contextual information which is likely to be displayed on a social video module 120. For example, if many comments were received, the video context module 230 may retrieve a subset of the comments from the action log 220 (e.g., the most recent comments and/or the comments with the most reactions); alternatively, the video context module 230 may retrieve all of the comments from the action log 220, and only transmit a subset of the comments to a client device 110. The video context module 230 may store the contextual information for each video retrieved from the content store 210, action log 220, and any other sources and periodically update the contextual information associated with each video, e.g., on a regular schedule, when new contextual information for the video is received by the social networking system 140, or when a user requests contextual information for a video. The video itself may be transmitted from the content store 210 or from another video server; for example, the social networking system 140 may transmit a link or other address for the client device 110 to retrieve a video for display in the social video module 120.

The messaging module 235 enables direct interaction between users of the social networking system 140. The messaging module 235 exchanges messages among the users of the client devices 110. The messaging module 235 also stores the messages on the social networking system 140 for retrieval by the users. For example, the messaging module 235 may store a message thread that can be retrieved by any of the users who are party to that thread.

The web server 240 links the social networking system 140 via the network 130 to the one or more client devices 110. The web server 240 serves web pages, as well as other content, such as JAVA®, FLASH®, XML, and so forth. The web server 240 may serve content to the social video module 120. The web server 240 may also receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems.

Figure 3:
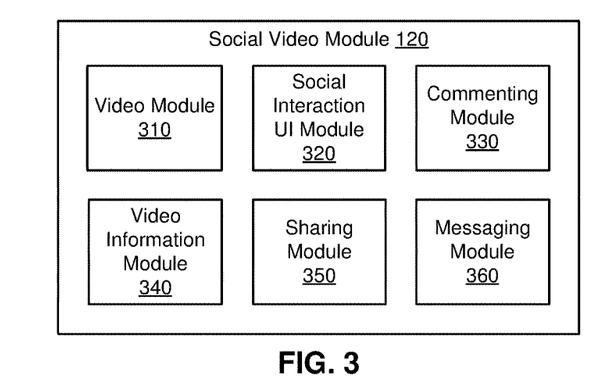
FIG. 3 is a block diagram illustrating the social video module according to one embodiment.

FIG. 3 is a block diagram of the social video module 120 of a client device 110 according to one embodiment. The social video module 140 includes modules for displaying videos and providing social interaction features related to the displayed videos to users. The social video module 120 includes a video module 310, a social interaction UI module 320, a commenting module 330, a video information module 340, a sharing module 350, and a messaging module 360. In other embodiments, the social video module 120 may include additional, fewer, or different modules. In addition, the functions attributed to particular modules may be performed by other modules in different embodiments.

The video module 310 controls the playback of a video provided by the social networking system 140. The video module 310 receives a video over the network 130 and decodes the video for playing on the display screen associated with the client device 110.

Figure 4:
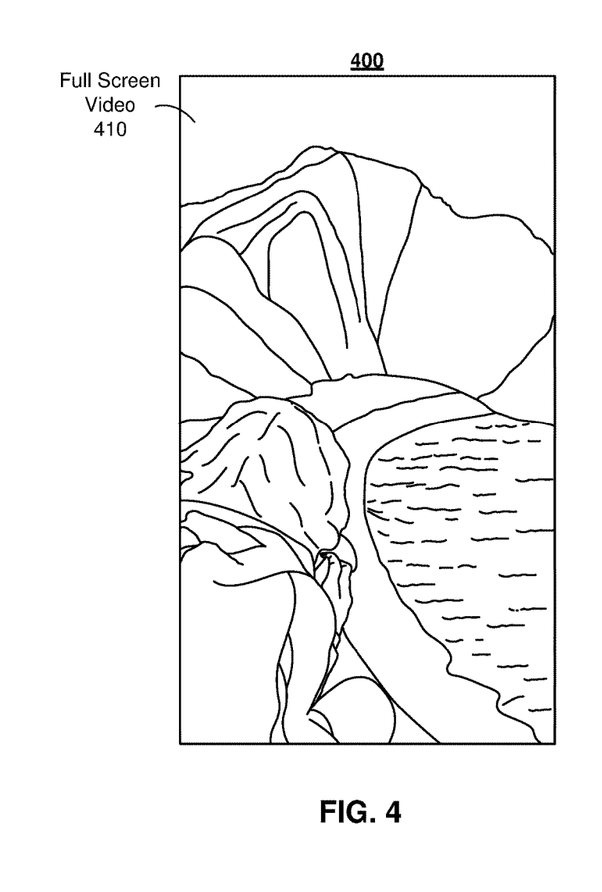
FIG. 4 illustrates a screen of a client device displaying a video according to one embodiment.

FIG. 4 illustrates a screen 400 of the client device 110 displaying a video according to one embodiment. As shown in FIG. 4, the video module 310 is displaying a full screen video 410 in portrait mode on a client device 110. The video module 310 can receive and respond to playback commands from a user, such as play, pause, stop, skip to a position within the video, skip to another video, rewind, and fast forward. The video module 310 may provide on-screen controls for controlling the playback, such as a scrubber bar and play/pause button (not shown in FIG. 4), which may be displayed responsive to a user command and removed after a period of inaction.

The social interaction user interface (UI) module 320 controls a UI that provides social interaction features for the video displayed by the video module 310. In some embodiments, the social interaction UI module 320 also controls the presentation of the video displayed by the video module 310, e.g., whether the video is displayed in full-screen or partial screen mode, and, in partial screen mode, in which area of the screen the video is displayed. In the full-screen mode, a video is displayed across all or substantially all of the viewing area of a device (e.g., a display screen associated with the client device 110) with no or only limited space remaining in the viewing area beside the video for display of additional content. In the partial-screen or "scaled" mode, the video is displayed in a portion of the viewing area that is significantly less than all of the viewing area and allows additional content to be displayed in another portion of the viewing area. The social interaction UI module 320 also receives user commands and, responsive to user commands, configures and displays a social interaction UI on the display screen associated with the client device 110.

Figure 5:
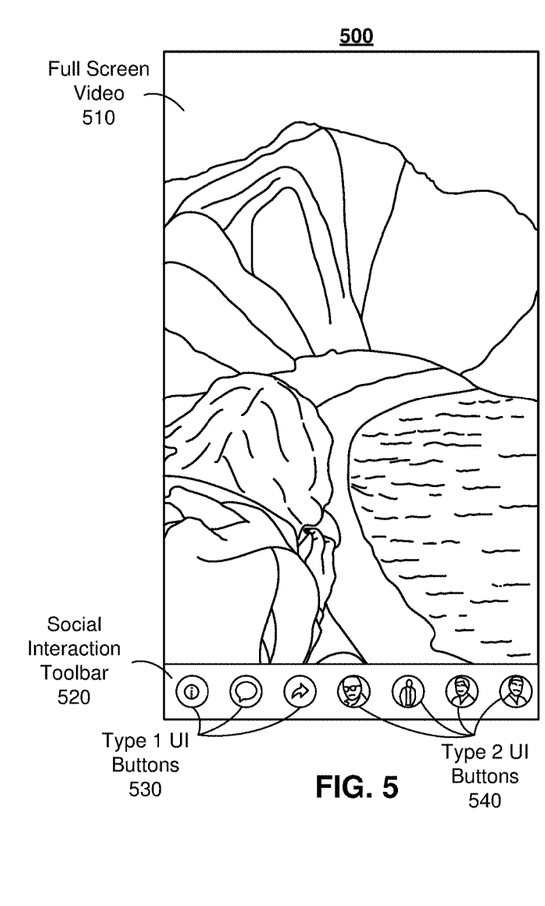
FIG. 5 illustrates a screen of a client device displaying a video and a social interaction UI according to one embodiment.

The social interaction UI includes a social interaction toolbar displayed along the edge of a viewing area (e.g., the display screen of the client device 110). An example of the social interaction toolbar is shown in FIG. 5, which illustrates a screen 500 of a client device simultaneously displaying a video and a social interaction UI. Upon receiving a suitable user input, the social interaction UI module 320 displays a social interaction toolbar 520 while displaying a full screen video 510. The social interaction toolbar includes a row of UI buttons 530 and 540, each of which corresponds to a particular feature, such as information, comments, sharing, or messaging. Buttons for any set of social interaction features or other types of features may be included in the social interaction toolbar 520.

In some embodiments, the social interaction toolbar 520 includes two different types of buttons, type 1 UI buttons 530 and type 2 UI buttons 540 (referred to collectively as UI buttons 530 and 540). In the example shown in FIG. 5, the social interaction toolbar 520 includes three type 1 UI buttons 530, which corresponding to general social interaction interfaces, such as group commenting or sharing. The types of social interactions accessed through the type 1 UI buttons 530 may be considered general social interactions, because they are not interactions with any specific person. The type 2 UI buttons 540 are messaging buttons. All of the type 2 UI buttons 540 correspond to the messaging feature, and each type 2 UI button 540 corresponds to a specific, individual user with whom the user can message. Each user may have many contacts, and including an individual type 2 UI button 540 for each contact provides a convenient way to access and send messages for a particular contact. The interactions accessed through the type 2 UI buttons 540 may be considered specific social interactions, because they allow the user to have social interactions with specific users. Further, as used herein, each type 2 UI button 540 corresponds to an interactive feature, and each messaging session with a different user may be considered a separate interactive feature. In other embodiments, the social interaction toolbar includes only one type of button, or more than two types of buttons.

As shown in FIG. 5, the social interaction toolbar 520 is displayed in a small rectangular region across an edge of the screen 500 and has a single array of UI buttons 530 and 540. While the social interaction toolbar 520 is shown extending horizontally across one of the short edges of the screen 500 (in this case, the lower edge), the social interaction toolbar 520 may alternatively extend horizontally across an upper edge of the screen, or extend vertically across a long edge (i.e., the left edge or the right edge) of the screen. The social interaction toolbar 520 overlays a portion of the full-screen video 510.

The social interaction toolbar 520 covers only a small portion of the screen 500, e.g., between 5 and 15% of the total area of the screen 500. Advantageously, the social video module 120 can display the video as a full-screen video 510 while simultaneously displaying the social interaction toolbar 520 with minimal impact on a user's viewing experience. In the example shown in FIG. 5, the social interaction toolbar 520 is an opaque overlay over the full screen video 510. In other embodiments, the social interaction toolbar 520 is partially transparent to further lessen impact of the social interaction toolbar 520 on the viewing experience. The UI buttons 530 and 540 and the background of the social interaction toolbar 520 may have different levels of transparency; for example, the UI buttons 530 and 540 may be fully opaque while the background of the social interaction toolbar 520 is partially transparent, or the UI buttons 530 and 540 may be partially transparent but with a lower transparency than the background of the social interaction toolbar 520.

If more interactive features are available than can fit in the social interaction toolbar 520, the social interaction toolbar 520 can be scrolled to display additional UI buttons. For example, if the user has more contacts corresponding to more type 2 UI buttons 540 than can be displayed on the screen 500, scrolling the social interaction toolbar 520 allows the user to conveniently and easily access buttons corresponding to these contacts, without obscuring the video. Thus, the social interaction UI module 320 provides a way to socially interact with individual contacts and a convenient way to access the controls to provide such individual interactions, without interfering with the video. To scroll the social interaction toolbar 520, the social interaction UI module 320 may detect a scrolling user input in the area of the social interaction toolbar 520, the social interaction UI module 320 scrolls the array of displayed UI buttons 530 and 540 within the social interaction toolbar 520, hiding one or more displayed buttons and exposing one or more previously undisplayed buttons. In one embodiment, the buttons 530 and 540 in the social interaction toolbar 520 scroll as a single row along the short axis. In other embodiments, the buttons 530 and 540 in the social interaction toolbar 520 scroll in the direction of the long axis, exposing one row at a time. In one embodiment, the positions of the type 1 UI buttons 530 remain fixed, while the type 2 UI buttons 540 are scrolled.

If the user does not interact with the social interaction toolbar 520 for a threshold amount of time, the social interaction UI module 320 will hide the social interaction toolbar 520 and display the full screen video 510 alone, as shown in FIG. 4. In some embodiments, the social interaction UI module 320 may receive an explicit input to hide the social interaction toolbar 520, e.g., a downward swipe in the area of the social interaction toolbar 520, or a tap of a close button (not shown in FIG. 5) within the social interaction toolbar 520. In response to such input, the social interaction UI module 320 will hide the social interaction toolbar 520.

The UI buttons 530 and 540 may act as radio buttons in which only one of the buttons can be selected at a time. When a user selects a particular button (e.g., by tapping on a touch screen at the location of a button), the social interaction UI module 320 visually distinguishes the selected button from the unselected buttons, e.g., by altering one or more visual characteristics of the selected button, including size, color, opacity, outline, and shading. In some embodiments, the social interaction UI module 320 may alternatively or additionally modify the appearance of the unselected UI buttons.

Figure 7:
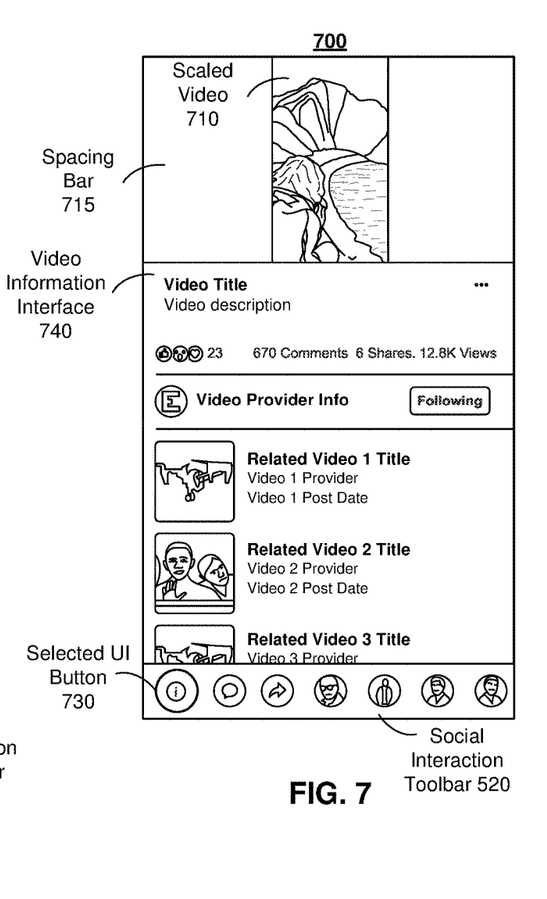
FIG. 7 illustrates a screen of a client device displaying a video and an information interface according to one embodiment.
Figure 8:
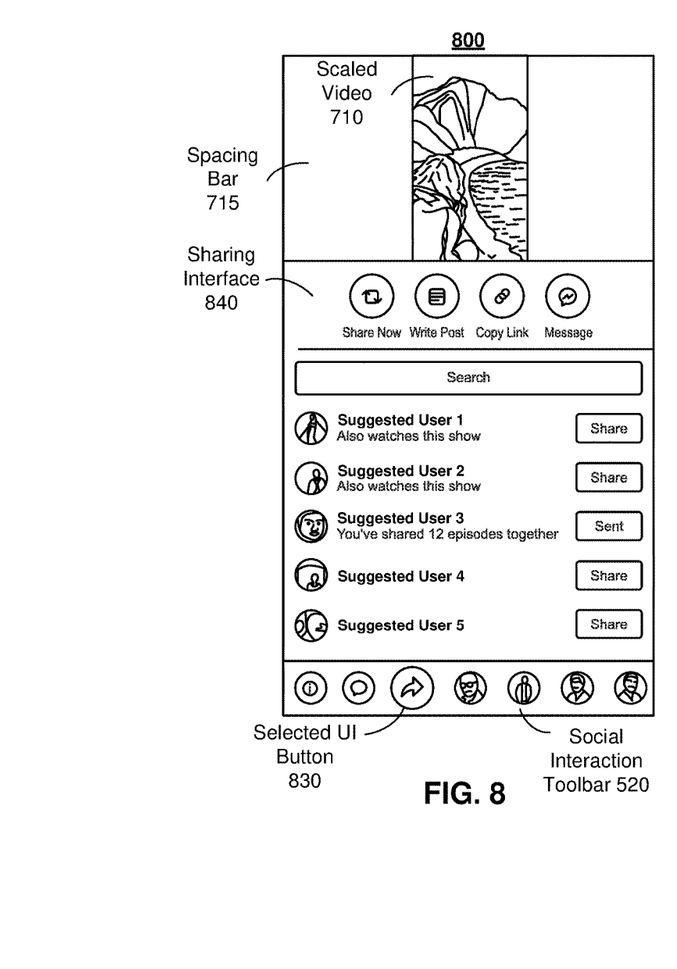
FIG. 8 illustrates a screen of a client device displaying a video and a sharing interface according to one embodiment.
Figure 9:
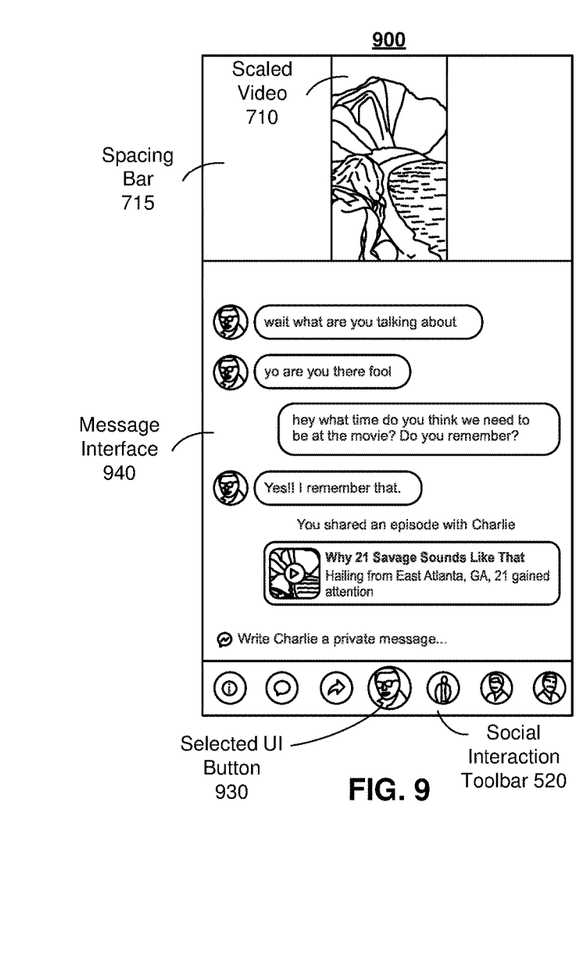
FIG. 9 illustrates a screen of a client device displaying a video and a messaging interface according to one embodiment.

In addition, the social interaction UI module 320 displays a particular social interaction interface corresponding to the selected button, while simultaneously displaying the video and the social interaction toolbar. Exemplary social interaction interfaces may be provided by modules 330-360, described below, and examples of the social interaction interfaces are shown in FIGS. 6-9. When the social interaction UI module 320 displays certain social interaction interfaces, the social interaction UI module 320 also modifies the video so that both the video and the interface fit on the screen, as shown in FIGS. 7-9. The modification may include scaling the video, shifting the video, or both scaling and shifting the video.

The social interaction UI module 320 may display an animation showing the modification of the video while the selected social interaction interface appears on-screen. For example, as the social interaction UI module 320 transitions from a screen that displays a full-screen video to a screen with a scaled and shifted video, the social interaction UI module 320 may display an animation that shows the video scaling from full-screen to partial-screen and shifting in position, and that shows spacing bars appear along the sides of the scaled video. The animation displayed by the social interaction UI module 320 may also show the selected social interaction interface expanding outwards from the social interaction toolbar 520, e.g., rising up from the social interaction toolbar 520 for the configuration shown in FIG. 5.

Other social interaction interfaces may be partially transparent and displayed as overlays over the full-screen video. While the social interaction interface is displayed, the social interaction UI module 320 continues displaying the social interaction toolbar, which allows a user to switch between different social interaction interfaces by selecting different buttons, or to tap the button corresponding to a currently-displayed interface to hide the interface.

One exemplary social interaction interface is provided by the commenting module 330. The commenting module 330 provides a social interaction interface in the social interaction UI for displaying comments to a user and receiving comments from a user related to a video displayed by the video module 310. The commenting module 330 retrieves comments associated with the video from the video context module 230 and formats the comments for display on the client device 110. The commenting module 330 may also display a comment prompt and receive a new comment written by a user of the client device 110; the commenting module 330 transmits the new comment to the social networking system 140.

Figure 6:
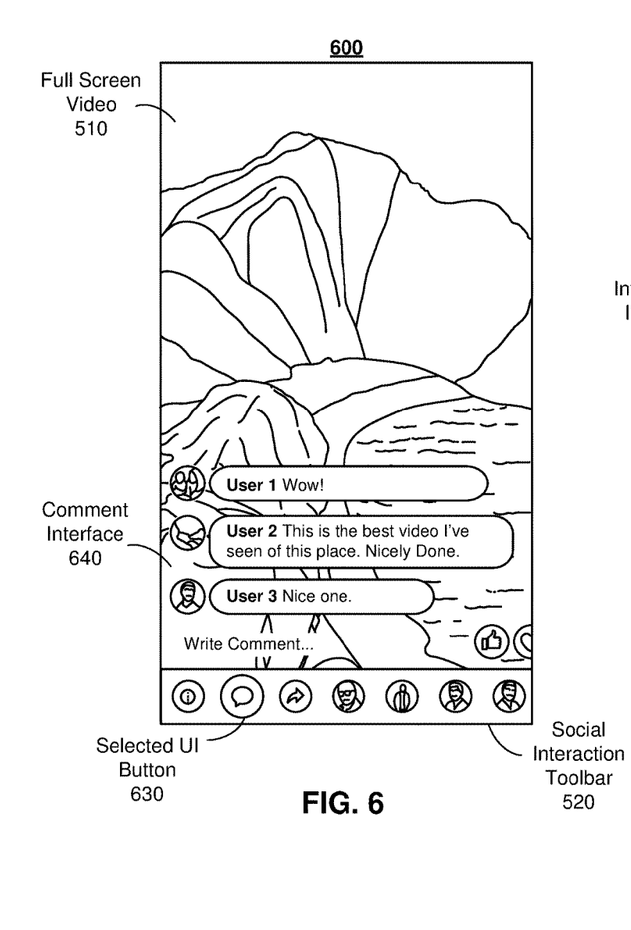
FIG. 6 illustrates a screen of a client device displaying a video and a comment interface according to one embodiment.

An example of a comment interface provided by the commenting module 330 is shown in FIG. 6, which illustrates a screen 600 associated with a client device 110. The screen 600 includes the full screen video 510 and the social interaction toolbar 520, which includes a selected UI button 630. The screen 600 also includes a comment interface 640 configured for display by the commenting module 330 and displayed as an overlay over the full screen video 510.

The social interaction UI module 320 displays the comment interface 640 in response to receiving a user selection of the comment button, which is the selected UI button 630, in the social interaction toolbar 520. After the selection of a UI button the social interaction UI module 320 modifies the display of the social interaction toolbar 520 to visually distinguish the selected UI button. In the example shown in FIG. 6, the social interaction UI module 320 visually distinguishes the selected UI button 630 by increasing its size relative to the other UI buttons.

As shown in FIG. 6, the social interaction UI module 320 displays the comment interface 640 an overlay over the full screen video 510. One or more of the elements of an overlaid interface, such as the comment interface 640, may be partially transparent, so that the video is visible through the overlaid interface. Alternatively, the overlaid interface may be opaque if the size and placement of the overlaid interface does not impact visibility of the full screen video 510 to an undesirable extent. For example, in FIG. 6, the comment interface 640 only covers about a third of the screen, and the video 510 is still visible in the area between various elements of the comment interface 640. For other social interaction interfaces that take up a larger screen area, the social interaction UI module 320 may modify the display of the video, so that the full video is visible on a smaller portion of the screen.

The video information module 340 provides a social interaction interface in the social interaction UI for displaying information about a video. This information can include identifying information, such as title, description, provider, length, and upload date. The video information can also include, e.g., user reactions (e.g., like, dislike, love, etc.), a list of related videos, one or more categories, license information, or other relevant information of potential interest to a user. The video information module 340 retrieves the information associated with a video displayed by the video module 310 from the video context module 230. The video information module 340 formats the information for display on the client device 110.

An example of a video information interface provided by the video information module 340 is shown in FIG. 7, which illustrates a screen 700 associated with a client device 110. The screen 700 includes a scaled video 710 bounded by spacing bars 715. Below the scaled video 710 is a video information interface 740, which is configured for display by the video information module 340. Below the video information interface 740 is the social interaction toolbar 520 with a selected UI button 730. The social interaction UI module 320 displays the video information interface 740 in response to receiving a user selection of the video information button, which is the selected UI button 730, in the social interaction toolbar 520. The user may request access to the screen 700 by selecting the video information button on any screen displaying the social interaction toolbar 520.

The sharing module 350 provides a social interaction interface in the social interaction UI that allows a user to share a video with one or more contacts. For example, the sharing module 350 can provide a display on the client device 110 of options for how to share a video displayed by the video module 310, e.g., as a public post, in a private message, by copying a link, etc. One or more of the sharing options may involve the social networking system 140; for example, a public post may be logged by the action logger 215, and a private message may be handled by the messaging module 235. The sharing module 350 can also provide a display on the client device 110 of suggested contacts for sharing the video.

An example of a sharing interface provided by the sharing module 350 is shown in FIG. 8, which illustrates a screen 800 associated with a client device 110. The screen 800 includes the scaled video 710 bounded by the spacing bars 715. Below the scaled video 710 is a sharing interface 840, which is configured for display by the sharing module 350. The social interaction UI module 320 displays the sharing interface 840 in response to receiving a user selection of the sharing button, which is the selected UI button 830, in the social interaction toolbar 520.

The messaging module 360 provides a social interaction interface in the social interaction UI that allows a user to exchange messages with contacts. For example, the messaging module 360 can provide a display on the client device 110 of a message history and a prompt for a user to enter a new message. Private messages may be received, stored, and transmitted to users by the messaging module 235.

An example of a messaging interface provided by the messaging module 360 is shown in FIG. 9, which illustrates a screen 900 associated with a client device 110. The screen 900 includes the scaled video 710 bounded by the spacing bars 715. Below the scaled video 710 is a messaging interface 940, which is configured for display by the messaging module 360. The social interaction UI module 320 displays the messaging interface 940 in response to receiving a user selection of one of the messaging buttons (i.e., the type 2 UI buttons 540), each of which corresponds to a different contact with whom the user can message. As discussed above, the user can scroll the social interaction toolbar 520 to expose additional type 2 UI buttons 540 corresponding to additional contacts with whom the user can message. In the example of FIG. 9, the messaging button corresponding to a particular contact is the selected UI button 930 in the social interaction toolbar 520, and the displayed messaging interface 940 includes messages to and from the particular contact corresponding to the selected UI button 930. The messaging module 360 configures messaging interfaces in response to the user selecting the other type 2 UI buttons 540, which correspond to other users.

If a threshold amount of time passes during which a social interaction interface is displayed, and the social interaction UI module 320 receives no input from the user, the social interaction UI module 320 removes the social interaction interface provided by one of the modules 330-360, and if needed, modifies the display of the video back to its initial display (e.g., full-screen). In some embodiments, the social interaction UI module 320 concurrently removes the social interaction toolbar and the social interaction interface; in other embodiments, the social interaction UI module first removes the social interaction interface and modifies the display of the video after a first threshold amount of time passes, and then removes the social interaction toolbar from the display after a second threshold amount of time passes. In some embodiments, the social interaction UI module 320 may receive an explicit input to hide a social interaction interface, e.g., a downward swipe in the area of the social interaction interface, or a tap of a selected UI button corresponding to the displayed social interaction interface within the social interaction toolbar 720. In response to such input, the social interaction UI module 320 will hide the social interaction interface, and the social interaction UI module 320 will return to the display screen of FIG. 4 (if the social interaction toolbar is also dismissed) or FIG. 5 (if the social interaction toolbar remains on-screen).

In the examples shown in FIG. 4-9, the full screen video 410 or 510 was a portrait-mode video that matched the dimensions of the screen associated with the client device 110. In other embodiments, the social interaction UI module 320 can provide similar social interaction UI for videos that do not match the dimensions of the screen.

Figure 10:
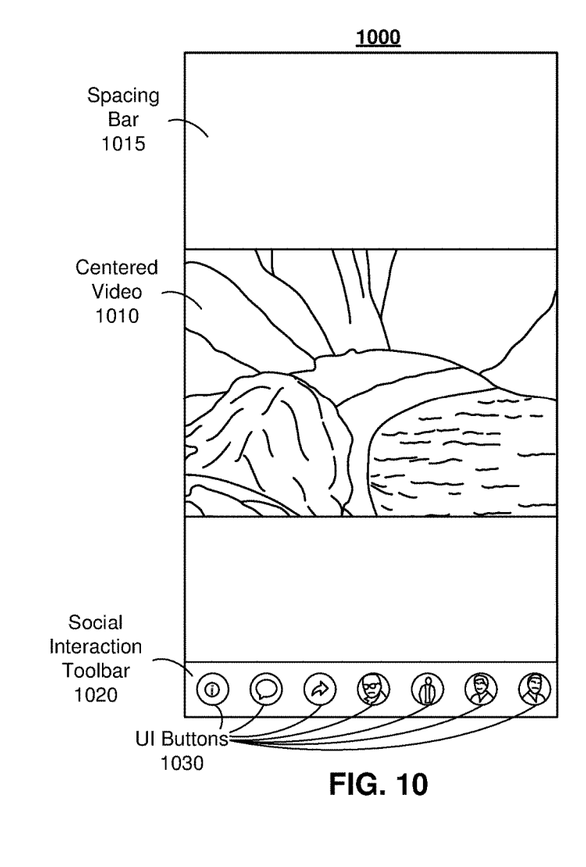
FIG. 10 illustrates a screen of a client device displaying a video in landscape mode according to one embodiment.

FIG. 10 illustrates a screen 1000 of a client device displaying a video in landscape mode according to one embodiment. In this example, the social interaction UI module 320 configures the screen with a centered video 1010, provided by the video module 310, and a social interaction toolbar 320 having UI buttons 1030. The centered video 1010 has a different aspect ratio from the video shown in FIGS. 4-9, being wider than it is tall; the video shown in FIGS. 4-9, on the other hand, fit the screen in portrait mode. Since the centered video 1010 does not fill the screen 1000 to all of its edges, the social interaction UI module 320 centers the video on the screen 1000 and bounds the centered video 1010 by two spacing bars 1015 above and below the centered video 1010. The social interaction toolbar 1020, like the social interaction toolbars shown in FIGS. 5-9, is displayed by the social interaction UI module along the bottom edge of the screen 1000. The social interaction toolbar 1020 behaves in a similar manner to social interaction toolbar 520, as described with respect to FIG. 3.

Similar spacing bars 1015 may be used for any other video aspect ratio that does not align with the dimensions of the display screen. For example, if a video is narrower than the video shown in FIGS. 4-9, the social interaction UI module 320 may insert spacing bars on the left and right sides of the video. The social interaction UI module 320 displays the same social interaction toolbar 1020 along the same edge of the screen regardless of the aspect ratio of the video. A video surrounded by spacing bars to cover the screen is considered a full-screen video that is displayed across substantially all of the viewing area of a device.

Figure 11:
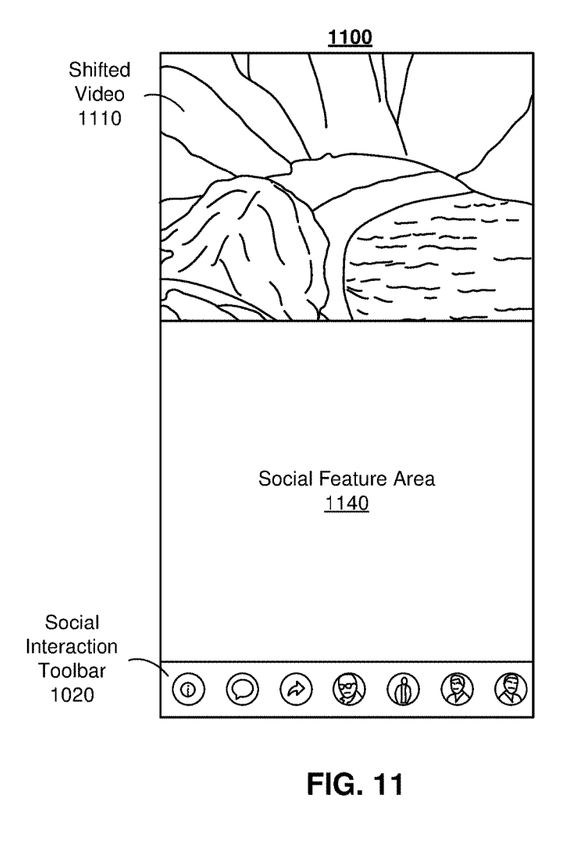
FIG. 11 illustrates a screen of a client device displaying a video in landscape mode and a social interaction UI according to one embodiment.

FIG. 11 illustrates a screen 1100 of a client device displaying a video in landscape mode and a social interaction UI according to one embodiment. If the social interaction UI module 320 receives a selection of one of the UI buttons 1030 within the social interaction toolbar 1020, the social interaction UI module 320 shifts the video from the centered position, shown in FIG. 10, to the location of the shifted video 1110 in FIG. 11. The social interaction UI module 320 positions an interface corresponding to the requested social feature (e.g., comment, video information, sharing, or messaging) below the shifted video 1110 in the social feature area 1140. The interface itself is provided by the appropriate module, e.g., one of modules 330-360 described with respect to FIG. 3. The social interaction UI module continues to display the social interaction toolbar 1020. As described with respect to FIG. 3, the social interaction UI module 320 may visually distinguish the UI button corresponding to the interface displayed in the social feature area 1140.

As the social interaction UI module 320 transitions between screen 1000 and 1100, the social interaction UI module 320 may display an animation showing the video shifting from the centered position 1010 to the shifted position 1110. If the shifted video 1110 is also scaled, the animation may show the video scaling from a first size to a second size. The animation displayed by the social interaction UI module 320 may also show the social feature area 1140 rising up from the social interaction toolbar 1120.

If the video does not cover the full screen, the social interaction UI module 320 may not have any of the available interfaces overlay the video. For example, whereas the commenting interface was shown as an overlay over a full screen video in FIG. 6, for the video shown in FIG. 11, the commenting interface may be displayed in the social feature area 1140, and the video may be shifted rather than maintain its centered position.

The geometry of the screens shown in FIGS. 4-11 is exemplary. It should be understood that the social interaction UI module 320 may be configured to provide a social interaction UI on different screen sizes and aspect ratios, including screens that are wider than they are tall. Further, the geometry and position of the social interaction toolbar shown in FIGS. 4-11 are exemplary. For example, the toolbar 520 or 1020 can be thicker or thinner, and can be displayed along a top edge or a side edge of a display screen.

Figure 12:
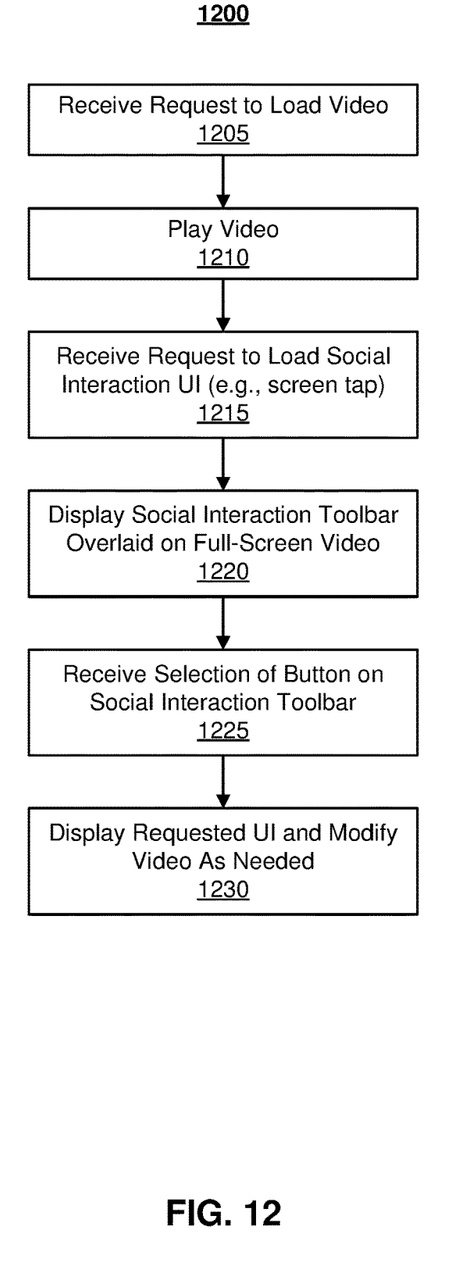
FIG. 12 illustrates a flow chart showing transitions between UI screens responsive to user inputs according to one embodiment.

FIG. 12 shows a flow chart showing transitions between UI screens responsive to user inputs according to one embodiment. The steps of FIG. 12 may be performed by the social video module 120 as described below. Some or all of the steps may be performed by other modules in other embodiments. In addition, other embodiments may include different and/or additional steps and the steps may be performed in different orders.

The social video module 120 receives 1205 a request to load a video. For example, the social video module 120 may receive a user selection of a video in a social networking app, website, or another interface on the client device 110.

Responsive to this request, the social video module 120 displays 1210 a video corresponding to the requested video. For example, the video module 310 may obtain, configure, and display the video at a location of a viewing area of a device (e.g., the display screen associated with the client device 110) specified by the social interaction UI module 320. The video module 310 may display the video across substantially all of the viewing area of the device. An exemplary screen showing the social video module 120 playing a full screen video is shown in FIG. 4. If the aspect ratio of the video does not match the dimensions of the display screen, the social video module 120 may display spacing bars and center the video on the display screen between the spacing bars, as shown in FIG. 10.

The social video module 120 receives 1215 a user input in connection with the displayed video corresponding to a request to display a social interaction toolbar. For example, the social video module 120 may receive a user input tapping the viewing area while the video is playing. Alternatively, the social video module 120 may receive any other appropriate command, e.g., a keyboard press, mouse movement, press of a button, that the social video module is programmed to interpret as a request to load the social interaction UI.

Responsive to this request, the social video module 120 displays 1220 a social interaction toolbar along an edge of the viewing area of the device while simultaneously displaying the video. An example of the social interaction toolbar overlaid on a simultaneously-displayed full screen video is shown in FIG. 5. The social interaction toolbar includes buttons corresponding to different social interaction features. The social interaction toolbar may overlay a portion of the displayed video. If the video is not displayed in full screen, the social interaction toolbar may overlay a spacing bar, or a portion of the video and a portion of two spacing bars.

The social video module 120 receives 1225 a selection of a button on the social interaction toolbar. For example, the social video module 120 may receive a user input tapping the display screen at the location of a button.

Responsive to this selection, the social video module 120 displays 1230 the requested UI of the social interaction feature corresponding to the button selected by the user, and modifies the video as needed. For example, if the social interaction UI module 320 receives a user input selecting the video information button, the social interaction UI module 320 shifts and scales the video and displays the video information interface below the video, as shown in FIG. 7. In some embodiments, the requested UI is displayed as an overlay and the video need not be modified, as shown in FIG. 6.

Figure 13:
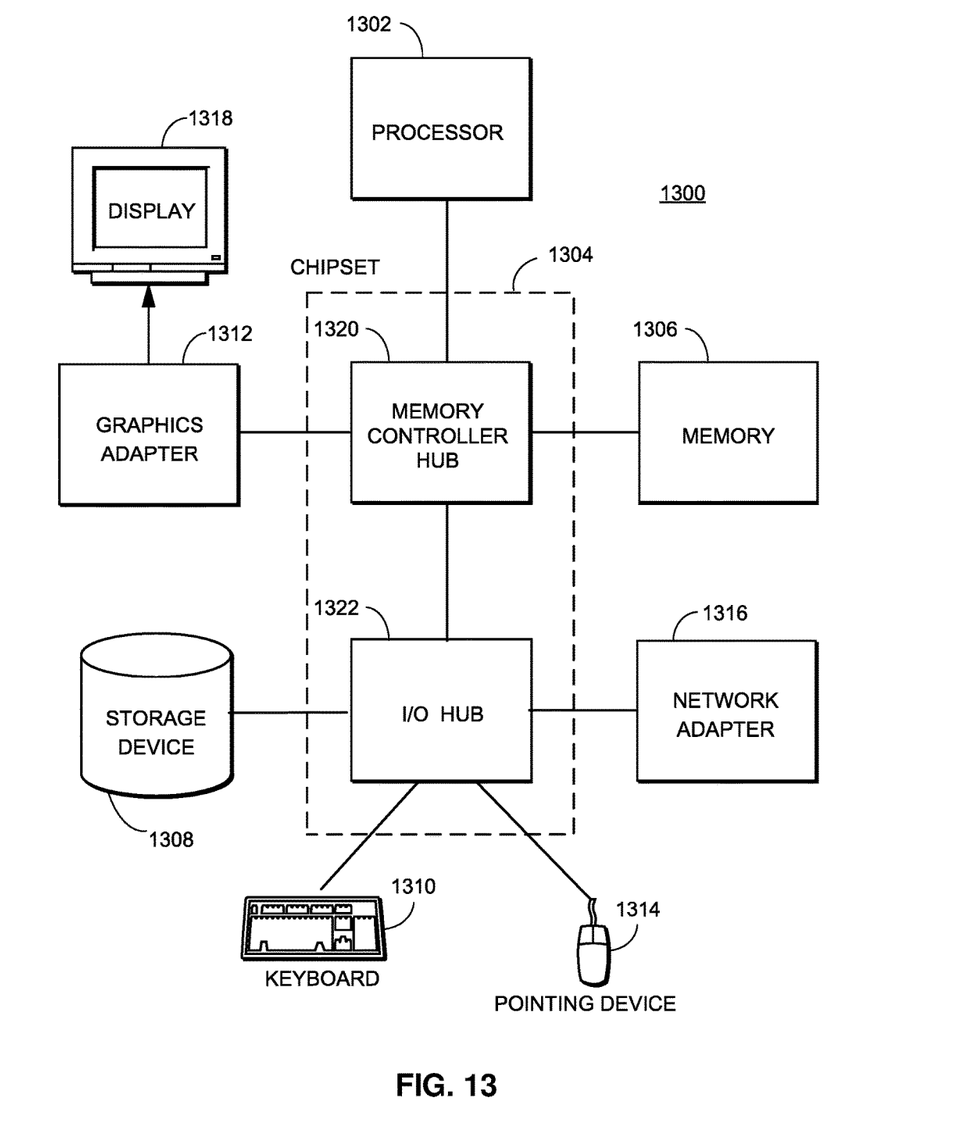
FIG. 13 is a high-level block diagram illustrating physical components of a computer used as part or all of one or more of the entities described herein in one embodiment.

FIG. 13 is a high-level block diagram illustrating physical components of a computer 1300 used as part or all of one or more of the entities described herein in one embodiment. For example, instances of the illustrated computer 1300 may be used as a client device 110 and/or the social networking system 140. Illustrated are at least one processor 1302 coupled to a chipset 1304. Also coupled to the chipset 1304 are a memory 1306, a storage device 1308, a keyboard 1310, a graphics adapter 1312, a pointing device 1314, and a network adapter 1316. A display 1318 is coupled to the graphics adapter 1312. In one embodiment, the functionality of the chipset 1304 is provided by a memory controller hub 1320 and an I/O hub 1322. In another embodiment, the memory 1306 is coupled directly to the processor 1302 instead of the chipset 1304. In one embodiment, one or more sound devices (e.g., a loudspeaker, audio driver, etc.) is coupled to chipset 1304.

The storage device 1308 is any non-transitory computer-readable storage medium, such as a hard drive, compact disk read-only memory (CD-ROM), DVD, or a solid-state memory device. The memory 1306 holds instructions and data used by the processor 1302. The pointing device 1314 may be a mouse, track ball, or other type of pointing device, and is used in combination with the keyboard 1310 to input data into the computer 1300. The graphics adapter 1312 displays images and other information on the display 1318. The network adapter 1316 couples the computer system 1300 to a local or wide area network.

As is known in the art, a computer 1300 can have different and/or other components than those shown in FIG. 13. In addition, the computer 1300 can lack certain illustrated components. In one embodiment, a computer 1300 acting as a server may lack a keyboard 1310, pointing device 1314, graphics adapter 1312, and/or display 1318. Moreover, the storage device 1308 can be local and/or remote from the computer 1300 (such as embodied within a storage area network (SAN)).

As is known in the art, the computer 1300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1308, loaded into the memory 1306, and executed by the processor 1302.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A non-transitory computer-readable storage medium storing computer program instructions executable by a processor to perform operations comprising:
in response to receiving a user input in connection with a displayed video, displaying a social interaction toolbar along an edge of a viewing area of a device, the social interaction toolbar comprising a plurality of buttons, each button corresponding to one of a plurality of social interaction features, and simultaneously displaying the video across substantially all of the viewing area of the device;
receiving a selection of a button of the plurality of buttons; and
in response to the selection:
displaying a user interface of the social interaction feature corresponding to the selected button in a first portion of the viewing area; and
modifying the displayed video to display the video in a second portion of the viewing area separate from the first portion, wherein the modifying comprises displaying an animation showing a motion of the video from being displayed across substantially all of the viewing area to being displayed in the second portion of the viewing area, wherein the animation is associated with scaling the video from a first size to a second size.

2. The computer-readable storage medium of claim 1, wherein, in response to receiving the user input, the social interaction toolbar displays a subset of the plurality of buttons in the social interaction toolbar, and the operations further comprise:
in response to receiving a scrolling user input, scrolling the plurality of buttons within the social interaction toolbar to hide at least one displayed button of the subset of the plurality of buttons, and expose at least one previously undisplayed button.

3. The computer-readable storage medium of claim 2, wherein the social interaction toolbar is aligned along a horizontal edge of the viewing area of the device, the plurality of buttons are arranged in a single horizontal row within the social interaction toolbar, and scrolling the plurality of buttons comprises scrolling the plurality of buttons horizontally along the single horizontal row within the social interaction toolbar.

4. The computer-readable storage medium of claim 1, wherein the plurality of buttons includes a first set of buttons of a first type corresponding to general social interactions, and a second set of buttons of a second type corresponding to specific social interactions.

5. The computer-readable storage medium of claim 1, wherein the animation further shows the user interface of the social interaction feature corresponding to the selected button expanding outwards from the social interaction toolbar.

6. A method comprising:
in response to receiving a user input in connection with a displayed video, displaying a social interaction toolbar along an edge of a viewing area of a device, the social interaction toolbar comprising a plurality of buttons, each button corresponding to one of a plurality of social interaction features, and simultaneously displaying the video across substantially all of the viewing area of the device;
receiving a selection of a button of the plurality of buttons; and
in response to the selection:
displaying a user interface of the social interaction feature corresponding to the selected button in a first portion of the viewing area; and
modifying the displayed video to display the video in a second portion of the viewing area separate from the first portion, wherein the modifying comprises displaying an animation showing a motion of the video from being displayed across substantially all of the viewing area to being displayed in the second portion of the viewing area, wherein the animation is associated with scaling the video from a first size to a second size.

7. The method of claim 6, wherein, in response to receiving the user input, the social interaction toolbar displays a subset of the plurality of buttons in the social interaction toolbar, the method further comprising:
in response to receiving a scrolling user input, scrolling the plurality of buttons within the social interaction toolbar to hide at least one displayed button of the subset of the plurality of buttons, and expose at least one previously undisplayed button.

8. The method of claim 7, wherein the social interaction toolbar is aligned along a horizontal edge of the viewing area of the device, the plurality of buttons are arranged in a single horizontal row within the social interaction toolbar, and scrolling the plurality of buttons comprises scrolling the plurality of buttons horizontally along the single horizontal row within the social interaction toolbar.

9. The method of claim 6, wherein the plurality of buttons includes a first set of buttons of a first type corresponding to general social interactions, and a second set of buttons of a second type corresponding to specific social interactions.

10. The method of claim 6, wherein the animation further shows the user interface of the social interaction feature corresponding to the selected button expanding outwards from the social interaction toolbar.

11. A system comprising:
a computer processor for executing computer program instructions; and
non-transitory computer-readable storage medium storing computer program instructions executable by a processor to perform operations comprising:
in response to receiving a user input in connection with a displayed video, displaying a social interaction toolbar along an edge of a viewing area of the system, the social interaction toolbar comprising a plurality of buttons, each button corresponding to one of a plurality of social interaction features, and simultaneously displaying the video across substantially all of the viewing area of the system;
receiving a selection of a button of the plurality of buttons; and
in response to the selection:
displaying a user interface of the social interaction feature corresponding to the selected button in a first portion of the viewing area; and
modifying the displayed video to display the video in a second portion of the viewing area separate from the first portion, wherein the modifying comprises displaying an animation showing a motion of the video from being displayed across substantially all of the viewing area to being displayed in the second portion of the viewing area, wherein the animation is associated with scaling the video from a first size to a second size.

12. The system of claim 11, wherein, in response to receiving the user input, the social interaction toolbar displays a subset of the plurality of buttons in the social interaction toolbar, and the operations further comprise:
in response to receiving a scrolling user input, scrolling the plurality of buttons within the social interaction toolbar to hide at least one displayed button of the subset of the plurality of buttons, and expose at least one previously undisplayed button.

13. The system of claim 12, wherein the social interaction toolbar is aligned along a horizontal edge of the viewing area of the system, the plurality of buttons are arranged in a single horizontal row within the social interaction toolbar, and scrolling the plurality of buttons comprises scrolling the plurality of buttons horizontally along the single horizontal row within the social interaction toolbar.

14. The system of claim 11, wherein the plurality of buttons includes a first set of buttons of a first type corresponding to general social interactions, and a second set of buttons of a second type corresponding to specific social interactions.

15. The system of claim 11, wherein the animation further shows the user interface of the social interaction feature corresponding to the selected button expanding outwards from the social interaction toolbar.

* * * * *